United States Patent Office 3,156,577
Patented Nov. 10, 1964

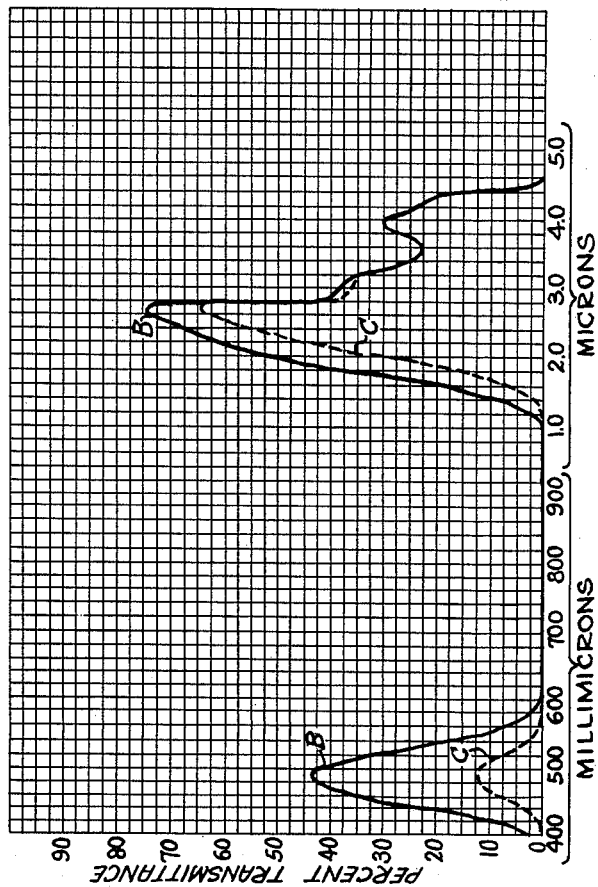

3,156,577
ABSORPTIVE GLASSES AND WELDING PLATES MADE THEREFROM
Lee O. Upton, Sturbridge, Mass., and Robert W. Young, Woodstock, Conn., assignors to American Optical Company, Southbridge, Mass., a voluntary association of Massachusetts
Filed May 16, 1962, Ser. No. 195,069
14 Claims. (Cl. 117—33.3)

This invention relates to an improved glass composition and method of making the same for use in forming welding plates or similar articles, wherein the absorptive characteristics of the glass in the visible region of the spectrum is selectively controlled while simultaneously absorbing in the ultra-violet and near infra-red portions of the spectrum in accordance with the resultant characteristics desired of said plates or similar articles.

The instant application is a continuation-in-part of applicants' application Serial No. 37,937, filed June 22, 1960, which was a continuation-in-part of applicants' application Serial No. 737,329, filed May 23, 1958, both now abandoned.

A principal object of the invention is to provide an inexpensive glass of the above character which is chemically stable particularly as to moisture attack at high humidity and high temperature and which is particularly stable to devitrification and method of making the same.

Another object is to provide a glass of the above character whose composition may be varied to produce glasses of different shades ranging from approximately 3.3 or lighter to approximately 5.0 and whose transmittance in the visible part of the spectrum will peak between 480 and 490 millimicrons and more desirably at 485 millimicrons and which has substantially no transmittance in wave lengths shorter than 400 millimicrons.

Another object is to provide glass compositions of shades varying from 3.3 to 5.0 having a thickness of approximately 3 mm. which contain:

| | Percent by weight |
|---|---|
| Silica, $SiO_2$ | From 44.8 to 65.4. |
| Calcium oxide, CaO | From 3.5 to 12.0. |
| Sodium oxide, $Na_2O$ | From 0 to 16.0. |
| Potassium oxide, $K_2O$ | From 0 to 16.0. |
| Lead oxide, PbO | From 0 to 25.8. |
| Bismuth trioxide, $Bi_2O_3$ | From 0 to 20.63. |
| Titanium dioxide, $TiO_2$ | From 0 to 2.0. |
| Copper oxide, CuO | From 1.7 to 4.5. |
| Cobalt oxide, $Co_2O_3$ | From 0.004 to 0.04. | wherein the $TiO_2$ content may be varied in accordance with the viscosity desired of the final melt, and wherein the $Bi_2O_3$ may be replaced partially or wholly by PbO or vice versa and the sum of $Bi_2O_3$ and PbO must equal at least 20% of the total batch; and the $Na_2O$ may be entirely or partially replaced by $K_2O$ with the sum of $Na_2O$ and $K_2O$ equalling at least 8% of the total batch.

Another object is to provide a 3.3 shade glass having a 3 mm. thickness whose proportions of ingredients may be varied as follows:

| | Percent by weight |
|---|---|
| Silica, $SiO_2$ | From 45.79 to 65.36. |
| Sodium oxide, $Na_2O$ | From 0 to 15.60. |
| Potassium oxide, $K_2O$ | From 0 to 15.72. |
| Calcium oxide, CaO | From 3.63 to 12.0. |
| Lead oxide, PbO | From 0 to 25.8. |
| Bismuth trioxide, $Bi_2O_3$ | From 0 to 20.63. |
| Titanium dioxide, $TiO_2$ | From 0 to 1.90. |
| Copper oxide, CuO | From 1.72 to 2.68. |
| Cobalt oxide, $Co_2O_3$ | From 0.0048 to 0.09824. | wherein if the percentages of copper oxide and cobalt oxide are 2.56% and 0.005%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa then the amounts of copper and cobalt oxides must be adjusted over the range to maintain the desired wave length and peak transmittance. As the $Bi_2O_3$ content in the glass is increased, the copper oxide must be decreased and the cobalt oxide increased proportionately; and vice versa if the glass contains more PbO than $Bi_2O_3$ in order to maintain the desired wave length and peak transmittance. When $Na_2O$ is substituted partially or wholly for $K_2O$ or vice versa, PbO may be proportionately, wholly, or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased, then the percentage of $Co_2O_3$ must be decreased proportionately and the percentage of CuO must be increased proportionately.

Another object is to provide a 5.0 shade glass for a 3 mm. thickness whose proportions of ingredients may be varied as follows:

| | Percent by weight |
|---|---|
| Silica, $SiO_2$ | From 44.86 to 64.10. |
| Sodium oxide, $Na_2O$ | From 0 to 15.30. |
| Potassium oxide, $K_2O$ | From 0 to 15.31. |
| Calcium oxide, CaO | From 3.5 to 11.82. |
| Bismuth trioxide, $Bi_2O_3$ | From 0 to 20.10. |
| Lead oxide, PbO | From 0 to 20.10. |
| Titanium dioxide, $TiO_2$ | From 0 to 1.90. |
| Copper oxide, CuO | From 2.86 to 4.47. |
| Cobalt oxide, $Co_2O_3$ | From 00.19 to 0.04. | wherein if the percentages of copper oxide and cobalt oxide are 4.26% and 0.02%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa, then the amounts of copper and cobalt oxides must be proportionately adjusted over the range to maintain desired wave length and peak transmittance. When the glass contains more $Bi_2O_3$, the copper oxide must be decreased and the cobalt oxide must be increased proportionately in order to maintain the desired wave length and peak transmittance. If $Na_2O$ is substituted partially or wholly for $K_2O$ or vice versa, PbO may be wholly or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased then the percentage of $Co_2O_3$ must be decreased proportionately and the percentages of CuO must be increased proportionately.

Another object is to provide glasses resulting from the above compositions having a metallic coating preferably of gold applied to a side surface thereof for the purpose of reflecting and thereby rejecting harmful infra-red radiations and which glasses will peak at substantially the same wave length as does the gold coating and which gold coating introduces only a negligible if any shift in the wave length of the composite structure.

Another object is to provide glasses ranging from a 3.3 shade to a 5.0 shade having a thickness of 3 mm. whose chemical analyses are substantially as follows:

| | Percent by weight |
|---|---|
| Silica, $SiO_2$ | From 50.10 to 51.34. |
| Iron plus aluminum oxides, $R_2O_3$ | From 0.90 to 0.98. |
| Calcium oxide, CaO | From 9.88 to 10.36. |
| Sodium oxide, $Na_2O$ | From 9.40 to 9.59. |
| Potassium oxide, $K_2O$ | From 5.64 to 5.79. |
| Lead oxide, PbO | From 19.94 to 20.39. |
| Copper oxide, CuO | From 2.50 to 4.12. |
| Cobalt oxide, $Co_2O_3$ | From 0.005 to 0.018. | wherein the iron oxide plus aluminum oxide are present as impurity contaminations.

Other objects and advantages of the invention will become apparent from the following description taken in connection with the accompanying drawings. It is to be understood that the description as set forth herein is not to be taken in any limited sense but more as illustrative as to how the invention may be practiced within the limits as defined by the accompanying claims.

The drawing shows a face view of a chart diagrammatically illustrating the transmittance curves in the visible and infra-red regions of the spectrum of 3..3 shade and 5.0 shade glasses having a thickness of 3 mm. resulting from batches which will hereinafter be defined as batches A through T and from glasses whose chemical analyses will be hereinafter referred to as D' and E'.

It has been found with known prior art welding plates, particularly those commonly used by welders utilizing helium or argon gas shielded arcs in welding aluminum, magnesium and other materials and for viewing the work for long sustained periods of time during said welding that the welder's eyes became irritated. This condition prevailed even when using certain prior art protective glasses several shades deeper than indicated necessary for the amperage and visible radiations of the welding arcs used. Welders also complained of a yellow flare light present in the arc or a blue haze or mist surrounding the work which obstructed the view of the wearer during the welding operations.

It, therefore, is a primary object of this invention to improve upon and overcome the above problems through the provision of an improved glass and method of making the same whose peak transmittance is substantially at 485 millimicrons and which is designed particularly for use in combination with a thin metallic coating, preferably gold, placed on a side surface of said glass and which is adapted to function cooperatively therewith in introducing the infra-red absorptive characteristics desired while eliminating the blue haze and yellow flare mentioned above, as well as providing a clearer view of the work with much greater comfort to the wearer after prolonged use of the welding equipment. The invention is further directed to the provision of glasses of the above character which are particularly durable and stable from a chemical point of view, that is, to chemical attack and to mosture attack at high humidity and high temperature.

The glasses of the invention basically embody as their major ingredient silica, $SiO_2$, having added thereto cobalt oxide and copper oxide as colorants wherein different given shades are obtained by varying the related proportions of said colorants.

The preferred range of shades from 3.3 to 5.0 as taken from specimens of said shades having a thickness of approximately 3 mm. is obtained from the following table of batch compositions given in percentages by weight:

| | Percent by weight |
|---|---|
| Silica, $SiO_2$ | From 44.8 to 65.4. |
| Calcium oxide, CaO | From 3.5 to 12.0. |
| Sodium oxide, $Na_2O$ | From 0 to 16.0. |
| Potassium oxide, $K_2O$ | From 0 to 16.0. |
| Lead oxide, PbO | From 0 to 25.8. |
| Bismuth trioxide, $Bi_2O_3$ | From 0 to 20.63. |
| Titanium dioxide, $TiO_2$ | From 0 to 2.0. |
| Copper oxide, CuO | From 1.7 to 4.5. |
| Cobalt oxide, $Co_2O_3$ | From 0.004 to 0.4. | wherein the $TiO_2$ content may be varied in accordance with the viscosity desired of the final melt, and wherein the $Bi_2O_3$ may be replaced partially or wholly by PbO or vice versa and the sum of $Bi_2O_3$ and PbO must equal at least 20% of the total batch; and the $Na_2O$ may be entirely or partially replaced by $K_2O$ with the sum of $Na_2O$ and $K_2O$ equalling at least 8% of the total batch.

It will be understood that the above-described glass compositions have been specified in conventional manner by reference to the calculated oxide compositions of the glass material provided by this invention. The actual raw batch ingredients which may be employed for achieving the described compositions can be selected according to their cost, availability, convenience, etc. in conventional manner. For example, the preferred raw batch ingredients which might be employed for providing a specific glass material according to this invention could comprise:

| | Parts by weight |
|---|---|
| Silica, $SiO_2$ | 2120 |
| Calcium carbonate, $CaCO_3$ | 716 |
| Potassium nitrate, $KNO_3$ | 516 |
| Lead oxide, PbO | 840 |
| Sodium carbonate, $Na_2CO_3$ | 684 |
| Copper oxide, CuO | 105 |
| Cobalt oxide, $Co_2O_3$ | 0.2 |

The specific glass composition thus described by reference to the raw batch ingredients used in forming the material is also described below in Example B by reference to the calculated oxide composition of the glass material. The various glass compositions set forth hereinafter are described by reference to their calculated oxide compositions but it will be understood that this is not intended to limit the actual raw batch ingredients which might be used in forming the glass materials.

The following table gives a range of batch compositions in percent by weight which will result in a 3.3 shade as taken from specimens having a 3 mm. thickness:

| | Percent by weight |
|---|---|
| Silica, $SiO_2$ | From 45.79 to 65.36. |
| Sodium oxide, $Na_2O$ | From 0 to 15.60. |
| Potassium oxide, $K_2O$ | From 0 to 15.72. |
| Calcium oxide, CaO | From 3.63 to 12.0. |
| Lead oxide, PbO | From 0 to 25.8. |
| Bismuth trioxide, $Bi_2O_3$ | From 0 to 20.63. |
| Titanium dioxide, $TiO_2$ | From 0 to 1.90. |
| Copper oxide, CuO | From 1.72 to 2.68. |
| Cobalt oxide, $Co_2O_3$ | From 0.0048 to 0.009824. | wherein if the percentages of copper oxide and cobalt oxide are 2.56% and 0.005%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa then the amounts of copper and cobalt oxides must be adjusted over the range to maintain the desired wave length and peak transmittance. As the $Bi_2O_3$ content in the glass is increased, the copper oxide must be decreased and the cobalt oxide increased proportionately and vice versa if the glass contains more PbO than $Bi_2O_3$ in order to maintain the desired wave length and peak transmittance. When $Na_2O$ is substituted partially or wholly for $K_2O$ or vice versa, PbO may be proportionately, wholly, or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased then the percentage of $Co_2O_3$ must be decreased proportionately and the percentage of CuO must be increased proportionately.

The following table gives a range of batch compositions in percent by weight which will result in a 5.0 shade as taken from specimens having a 3 mm. thickness:

| | Percent by weight |
|---|---|
| Silica, $SiO_2$ | From 44.86 to 64.10. |
| Sodium oxide, $Na_2O$ | From 0 to 15.30. |
| Potassium oxide, $K_2O$ | From 0 to 15.31. |
| Calcium oxide, CaO | From 3.5 to 11.82. |
| Bismuth trioxide, $Bi_2O_3$ | From 0 to 20.10. |
| Lead oxide, PbO | From 0 to 20.10. |
| Titanium dioxide, $TiO_2$ | From 0 to 1.90. |
| Copper oxide, CuO | From 2.86 to 4.47. |
| Cobalt oxide, $Co_2O_3$ | From 0.019 to 0.04. | wherein if the percentages of copper oxide and cobalt oxide are 4.26% and 0.02%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa, then the amounts of copper and cobalt must be proportionately adjusted over the range to maintain desired wave length and peak transmittance. When the glass contains more $Bi_2O_3$, the copper oxide must be decreased and the cobalt oxide must be increased proportionately in order to maintain the desired wave length and peak transmittance. If $Na_2O$ is substituted partially or wholly for $K_2O$ or vice versa, PbO may be wholly or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased then the percentage of $Co_2O_3$ must be decreased proportionately and the percentage of CuO must be increased proportionately.

It is to be understood that the compositions set forth above may be varied within said ranges in order to produce any intermediate shade desired.

Shade 3.3 for a thickness of 3 mm. may be produced by the following batches:

| | A | B | C | D |
|---|---|---|---|---|
| | Percent | Percent | Percent | Percent |
| $SiO_2$ | 45.79 | 51.64 | 65.36 | 58.47 |
| $Na_2O$ | 12.0 | 9.74 | 5.00 | 8.12 |
| $K_2O$ | 7.2 | 5.84 | 3.00 | 4.87 |
| CaO | 12.0 | 9.76 | 3.62 | 3.63 |
| PbO | 20.45 | 20.45 | 20.46 | 20.45 |
| $TiO_2$ | | | | 1.90 |
| CuO | 2.56 | 2.56 | 2.56 | 2.56 |
| $Co_2O_3$ | 0.005 | 0.005 | 0.005 | 0.005 |
| | 100.005 | 99.995 | 100.005 | 100.005 |

| | E | F | G | H | I | J |
|---|---|---|---|---|---|---|
| | Percent | Percent | Percent | Percent | Percent | Percent |
| $SiO_2$ | 51.82 | 51.95 | 51.95 | 52.08 | 51.58 | 51.90 |
| $Na_2O$ | 9.78 | 9.80 | | | 15.54 | 15.64 |
| $K_2O$ | 5.86 | 5.88 | 15.68 | 15.72 | | |
| CaO | 9.80 | 9.82 | 9.82 | 9.85 | 9.75 | 9.81 |
| $Bi_2O_3$ | 10.27 | 20.58 | | 20.63 | | 20.56 |
| PbO | 10.27 | | 20.58 | | 20.44 | |
| CuO | 2.20 | 1.96 | 1.96 | 1.72 | 2.68 | 2.08 |
| $Co_2O_3$ | 0.00855 | 0.00857 | 0.00735 | 0.009824 | 0.00487 | 0.00612 |
| | 100.00 | 99.99 | 99.99 | 100.00 | 99.99 | 99.99 | wherein if the percentages of copper oxide and cobalt oxide are 2.56% and 0.005%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa, then the amounts of copper and cobalt oxides must be adjusted over the range to maintain the desired wave length and peak transmittance. As the $Bi_2O_3$ content in the glass is increased, the copper oxide must be decreased and the cobalt oxide increased proportionately and vice versa if the glass contains more PbO than $Bi_2O_3$ in order to maintain the desired wave length and peak transmittance. When $Na_2O$ is substituted partially or wholly for $K_2O$ or vice versa, PbO may be proportionately, wholly or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased then the percentage of $Co_2O_3$ must be decreased proportionately, and then the percentage of CuO must be increased proportionately.

Shade 5.0 for a thickness of 3 mm. may be produced by the following batches:

| | K | L | M | N |
|---|---|---|---|---|
| | Percent | Percent | Percent | Percent |
| $SiO_2$ | 44.86 | 50.72 | 64.10 | 57.45 |
| $Na_2O$ | 11.84 | 9.57 | 5.00 | 7.97 |
| $K_2O$ | 7.10 | 4.74 | 3.00 | 4.78 |
| CaO | 11.82 | 9.59 | 3.52 | 3.52 |
| $TiO_2$ | | | | 1.90 |
| PbO | 20.10 | 20.10 | 20.10 | 20.10 |
| CuO | 4.26 | 4.26 | 4.26 | 4.26 |
| $Co_2O_3$ | 0.02 | 0.02 | 0.02 | 0.02 |
| | 100.00 | 100.00 | 100.00 | 100.00 |

| | O | P | Q | R | S | T |
|---|---|---|---|---|---|---|
| | Percent | Percent | Percent | Percent | Percent | Percent |
| $SiO_2$ | 51.71 | 52.10 | 50.52 | 51.46 | 51.31 | 51.71 |
| $Na_2O$ | | | 15.30 | 15.30 | 9.57 | 9.57 |
| $K_2O$ | 15.31 | 15.31 | | | 5.74 | 5.74 |
| CaO | 9.59 | 9.59 | 9.59 | 9.59 | 9.59 | 9.59 |
| $Bi_2O_3$ | | 20.10 | | 20.10 | 10.05 | 20.10 |
| PbO | 20.10 | | 20.10 | | 10.05 | |
| CuO | 3.26 | 2.86 | 4.47 | 3.50 | 3.66 | 3.26 |
| $Co_2O_3$ | 0.029 | 0.040 | 0.019 | 0.025 | 0.034 | 0.034 |
| | 100.00 | 100.55 | 100.00 | 100.00 | 100.00 | 100.00 | wherein if the percentages of copper oxide and cobalt oxide are 4.26% and 0.02%, respectively, then in order to maintain the desired transmittance peak the alkali ratio $Na_2O/K_2O$ must be approximately 1.667, thus enabling the silica content to be varied while maintaining the percentage of colorants constant in certain of said batches. If the PbO is partially or wholly replaced by $Bi_2O_3$ or vice versa, then the amounts of copper and cobalt oxides must be proportionately adjusted over the range to maintain desired wave length and peak transmittance. When the glass contains more $Bi_2O_3$, the copper oxide must be decreased and cobalt oxide must be increased proportionately in order to maintain the desired wave length and peak transmittance. If $Na_2O$ is substituted partially or wholly for $K_2O$ or vice versa, PbO may be wholly or partially substituted for $Bi_2O_3$ or vice versa. If the percentage of PbO and/or $Bi_2O_3$ is kept constant and if the $Na_2O$ is substituted partially or wholly for $K_2O$ or vice versa, then the copper oxide and cobalt oxide must be adjusted accordingly to maintain the desired wave length and peak transmittance. If the percentage of $K_2O$ is increased, then the percentage of $Co_2O_3$ must be increased proportionately and the percentage of CuO must be decreased proportionately. When the $Na_2O$ is increased, then the percentage of $Co_2O_3$ must be decreased proportionately and the percentage of CuO must be increased proportionately.

The chemical analyses of glasses embodying a range of ingredients resulting in a 3.3 shade glass up to 5.0 shade glass from 3 mm. thickness resulting from batches B and L are as follows:

Percent by weight

| | |
|---|---|
| Silica, $SiO_2$ | From 50.10 to 51.34. |
| Iron plus aluminum oxides, $R_2O_3$ | From 0.90 to 0.98. |
| Calcium oxide, CaO | From 9.88 to 10.36. |
| Sodium oxide, $Na_2O$ | From 9.40 to 9.59. |
| Potassium oxide, $K_2O$ | From 5.64 to 5.79. |
| Lead oxide, PbO | From 19.94 to 20.39. |
| Copper oxide, CuO | From 2.50 to 4.12. |
| Cobalt oxide, $Co_2O_3$ | From 0.005 to 0.018. | wherein the iron oxide plus aluminum oxide are present as impurity contaminations.

The specific chemical analysis for 3.3 shade glass of a thickness of 3 mm. resulting from batch B is as follows:

*Chemical Analysis D'*

| | |
|---|---|
| Silica, $SiO_2$ | 51.34 |
| Iron plus aluminum oxides, $R_2O_3$ | 0.90 |
| Calcium oxide, CaO | 10.36 |
| Magnesium oxide, MgO | 0.00 |
| Barium oxide, BaO | 0.00 |
| Sodium oxide, $Na_2O$ | 9.59 |
| Potassium oxide, $K_2O$ | 5.79 |
| Sulfur trioxide, $SO_3$ | 0.00 |
| Lead oxide, PbO | 19.94 |
| Copper oxide, CuO | 2.50 |
| Cobalt oxide, $Co_2O_3$ | 0.005 | wherein the iron oxide plus aluminum oxide are present as impurity contaminations.

The specific chemical analysis for 5.0 shade glass of a thickness of 3 mm. resulting from batch L is as follows:

*Chemical Analysis E'*

| | |
|---|---|
| Silica, $SiO_2$ | 50.10 |
| Iron plus aluminum oxides, $R_2O_3$ | 0.98 |
| Calcium oxide, CaO | 9.88 |
| Magnesium oxide, MgO | 0.00 |
| Barium oxide, BaO | 0.00 |
| Sodium oxide, $Na_2O$ | 9.40 |
| Potassium oxide $K_2O$ | 5.64 |
| Sulfur trioxide, $SO_3$ | 0.00 |
| Lead oxide, PbO | 20.39 |
| Copper oxide, CuO | 4.12 |
| Cobalt oxide, $Co_2O_3$ | 0.018 | wherein the iron oxide plus aluminum oxide are present as impurity contaminations.

In the chart of the drawing, the solid line B illustrates the transmittance curve for the lighter shade 3.3 for a thickness of 3 mm. which curve as shown on the left has a relatively sharp cut-off in the ultra-violet region at about 400 millimicrons and has a relatively sharp peak of approximately 43% transmittance at the 485 millimicron wave length. The cut-off in the visible part of the spectrum starts at 605 millimicrons and is opaque throughout the remainder of the visible to approximately 1.2 microns where the glass begins to transmit in the infrared. The infra-red transmittance peaks at approximately 2.7 microns and said transmittance at said peak is approximately 75%. The glass then cuts off at 4.6 microns and is thereafter opaque.

The said chart further illustrates, as shown by the short dash line C, the transmittance curve of a 5.0 shade for a thickness of 3 mm. It is particularly pointed out that this glass also peaks at the 485 millimicron line, similar to the 3.3 shade, and has cut-offs in the visible region at approximately 415 to 590 millimicrons and throughout the remainder of said visible spectrum is opaque. It again begins to transmit at approximately 1.25 microns in the infra-red region of the spectrum. The infra-red transmittance peaks at approximately 2.75 microns and said transmittance at said peak is approximately 64%. The glass then cuts off at 4.6 microns and is opaque thereafter.

While it has been specified that the various shades of glasses peak at approximately 485 millimicrons, it is to be understood that a permissible peak range may lie between 480 and 490 millimicrons. However, the 485 millimicron peak is preferred.

In following the teachings of applicants' invention, one first weighs out the ingredients of the batch using any commercially known scale in a conventional manner. The batch is mixed in a conventional manner using a conventional mixer. In the present case, a commercially known Patterson-Kelley Twin Shell Blender was used. The batch is then placed in a pot (refractory clay pot) or a mullite (aluminum silicate pot) preheated to a temperature between 2600° to 2700° F. The temperature is then held to approximately 2700° F.

As the glass batch melts, additional batch material is added until the pot is filled. The length of time depends upon the size of pot. For a pot which holds a 100-pound batch, the time cycle would take from five to seven hours to fill the pot. Therefore, the time cycle for filling the pot at the above temperature of heating is dependent upon the size of the batch that is being melted. After the final fill has been made, the bubbles are removed (allowed to fine) at this temperature for a period of three to four hours for a 100-pound batch size. After the glass has been completely melted out and fined, the temperature of the furnace pot and glass is gradually reduced to casting temperature while stirring which is from approximately 2000° to 2100° F. for a 100-pound size. The glass is then annealed at approximately 1100° F. for approximately four hours dependent upon the size and shape of the product being fabricated. The temperature is then reduced to room temperature over a period of approximately twenty-four hours. The length of annealing depends upon the thickness and shape of the final product being made.

Melting of the glass batches should be accomplished in a neutral or oxidizing atmosphere as is conventional practice whenever lead-bearing glass compositions are to be formed, thereby to avoid formation of a metallic lead precipitate within the glass melt. These desired neutral or oxidizing conditions would normally be provided without specific control where the glass batch is melted in a conventional electric furnace. Such neutral or oxidizing conditions would also normally result from the use of conventional raw batch ingredients in forming the glass materials of this invention as noted below. Thus where potassium oxide ($K_2O$) is introduced to a glass batch as potassium carbonate ($K_2CO_3$), potassium nitrate ($KNO_3$) or a combination of both as noted below, the desired neutral or oxidizing conditions will be established by the carbon dioxide ($CO_2$) and nitrogen dioxide ($NO_2$) gases given off during heating of the batch. Of course, where a nitrate is employed as a raw batch ingredient, it is conventional practice in glass manufacture to also employ a carbonate as a raw batch ingredient (see for example the preferred raw batch ingredients previously described), bubbles formed of both $CO_2$ and $NO_2$ being more easily removed from a glass melt than bubbles formed of either gas alone as is well known.

While cobalt oxide is referred to as $Co_2O_3$, it could be referred to as $CoO$ and still be within the scope of the invention, the percentages of $Co_2O_3$ reported to be in the noted glass compositions being expressed in corresponding percentages of $CoO$ by conversion of the reported percentages in accordance with the ratio of the atomic weights of the oxides in conventional manner. That is, any reported percentage of $Co_2O_3$ could be expressed as a corresponding percentage of $CoO$ by multiplying the reported percentage of $Co_2O_3$ by a factor of 0.9035. The various oxides given in the compositions are strictly in accordance with the standard method of reporting glass compositions. While cobalt oxide is reported as $Co_2O_3$, it is not actually determined in which oxide state it exists in the final glass. However, in chemical analysis, it is reported as $Co_2O_3$ similar to the sodium oxide being reported as $Na_2O$, potassium oxide as $K_2O$, etc. This is also true of all of the other ingredients. This is a standard practice known in the art and is understood by all individuals working in this field. This is a standard method of reporting the oxide composition of glasses. For example $K_2O$ does not exist as such. Potassium is usually introduced into a glass composition by using (potassium carbonate) $K_2CO_3$ or (potassium nitrate) $KNO_3$ or a combination of both. These materials, upon being heated, give off $CO_2$ and/or $NO_2$ leaving a loosely bonded $K_2O$ in the glass structure and upon reporting a chemical analysis, the amount of potassium is normally identified as percent $K_2O$.

In forming welding plates with the glasses of the present invention and to obviate possible undesirable radiations of the infra-red while retaining the desired absorptive characteristics of the glass, a thin metallic coating preferably of gold is placed on the side surface of the glasses which is to be the front thereof when in use or side away from the eyes. Gold is preferred as it peaks in the visible region of the spectrum at substantially the same wave length as do the glasses of the present invention and brings about little, if any, appreciable shift in said peaking. If the peak transmittance should be shifted to the left of the peaking set forth herein, the undesirable blue haze surrounding the work, previously referred to, becomes apparent and if said peak transmittance is shifted to the right, the undesirable yellow flare, previously referred to, becomes apparent. The ideal peak transmittance, therefore, is as set forth herein and is in the blue-green region.

The thickness of the gold is controlled so as to add from ¾ to approximately 1¾ shades to the glass. This is done by measuring the transmittance of the gold through a clear piece of glass to produce master curve which represents shade versus transmittance and allows for the control of the amount of shade being added to the glasses of the invention as the layer of gold is being applied and by simultaneously comparing the shade change with the master curve.

The above shades of glass are carefully controlled so that when said relatively thin coating of gold of controlled thickness is placed thereon, the shade numbers of the resultant plates or articles will be increased by approximately 1.0 shade numbers and will, therefore, be within the established commercial range of shades from 4 to 6.

In order to obtain the proper thickness of gold coatings for producing the ¾ to 1¾ shade numbers referred to above, the gold coating may be applied by a commonly known vacuum-depositing process. This process embodies the placing and supporting of a plurality of pieces of glass embodying the invention and which are to be gold-coated in a transparent glass bell jar and simultaneously placing a water-white piece of glass in said bell jar, drawing a vacuum in said jar and thereafter causing vaporized pure gold to be simultaneously deposited on a side surface of each of said pieces of glass in known conventional manner. During the depositing of said vaporized gold on said pieces of glass, a beam of light is directed through the water-white piece of glass in the bell jar onto a mirror which reflects the light through the bell jar onto an electronic instrument for measuring the percent transmittance of the light through said water-white piece of glass. This percent transmittance is then correlated into amount of shade numbers added to the water-white glass by a previously established transmittance versus shade addition curve as is common practice in the art. This is accomplished by making a plurality of samples of different transmittances and plotting these against shade additions to the water-white glass to establish a working curve. As the gold is being deposited upon the water-white piece of glass simultaneous to the deposition thereof on the pieces of glass embodying the invention, the thickness of said deposition on said water-white glass may be measured by the electronic instrument. When the desired thickness is obtained to produce the desired shade number as indicated by the instrument, the vacuum deposition is ceased. Thereby, the coatings on the pieces of glass embodying the invention will be of the same thickness as that simultaneously produced on the water-white piece of glass. The deposition of the gold coating onto the glass embodying the invention is of the evaporated type which takes place within a vacuum in a bell jar in commonly known manner.

The above is one method by which the desired thickness of gold coating may be obtained. Other known methods, however, may be used within the scope of the invention.

It is further pointed out that glasses resulting from the batches as given in the above tables will all peak in the visible region of the spectrum at approximately 485 millimicrons and the related proportions of ingredients given therein are so controlled as to give the proper shades of glasses when of a thickness of approximately 3 mm.

It has been found by actual test that the glasses resulting from the above batches not only have improved transmittance characteristics but are particularly durable and stable to chemical attack and to conditions of high temperatures and high humidity and are, therefore more desirable for use in the fabrication of welding plates of the character described.

It has been stated above that shades lighter than 3.3 may be formed. An example of a composition for shade 2.5 is outlined below in percentage by weight:

| | Percent |
|---|---|
| $SiO_2$ | 61.48 |
| $No_2O$ | 6.50 |
| $K_2O$ | 3.90 |
| $CaO$ | 5.86 |
| $PbO$ | 20.66 |
| $CuO$ | 1.60 |
| $Co_2O_3$ | 0.0012 |
| | 100.00 |

It is to be understood that certain of the ingredients may be varied in accordance with teachings set forth above in connection with certain of the compositions given for other shades of glass.

From the foregoing description, it will be apparent that simple, efficient and economical means and methods have been provided for obtaining all of the objects and advantages of the invention.

Having described our invention, we claim:

1. Glass articles of the character described ranging in shades from 3.3 to 5.0 having a thickness of approximately 3 mm. which are particularly durable and stable as to chemical attack and moisture attack at high humidity and high temperature resulting from the combining of:

| | Percent by weight |
|---|---|
| Silica, $SiO_2$ | From 44.8 to 65.4. |
| Calcium oxide, CaO | From 3.5 to 12.0. |
| Sodium oxide, $Na_2O$ | From 0 to 16.0. |
| Potassium oxide, $K_2O$ | From 0 to 16.0. |
| Lead oxide, PbO | From 0 to 25.8. |
| Bismuth trioxide, $Bi_2O_3$ | From 0 to 20.63. |
| Titanium dioxide, $TiO_2$ | From 0 to 2.0. |
| Copper oxide, CuO | From 1.7 to 4.5. |
| Cobalt oxide, $Co_2O_3$ | From 0.004 to 0.04. | where the sum of $Bi_2O^3$ and PbO must equal at least 20% of the total batch; and the sum of $Na^2O$ and $K^2O$ must equal at least 8% of the total batch, said glass being adapted for peak transmission of light of wave lengths between 480 and 490 millimicrons and for substantially complete absorption of light of wave lengths shorter than 400 millimicrons and of visible light of wave lengths longer than 600 millimicrons.

2. Glass articles of the character described of shade 3.3 having a thickness of approximately 3 mm. which are particularly durable and stable as to chemical attack and moisture attack at high humidity and high temperature resulting from the combining of:

| | Percent by weight |
|---|---|
| Silica, $SiO_2$ | From 45.79 to 65.36. |
| Sodium oxide, $Na_2O$ | From 0 to 15.60. |
| Potassium oxide, $K_2O$ | From 0 to 15.72. |
| Calcium oxide, CaO | From 3.63 to 12.0. |
| Lead oxide, PbO | From 0 to 25.8. |
| Bismuth trioxide, $Bi_2O_3$ | From 0 to 20.63. |
| Titanium dioxide, $TiO_2$ | From 0 to 1.90. |
| Copper oxide, CuO | From 1.72 to 2.68. |
| Cobalt oxide, $Co_2O_3$ | From 0.0048 to 0.009824. | wherein the sum of $Bi_2O_3$ and PbO must equal at least 20% of the total batch and the sum of $Na_2O$ and $K_2O$ must equal at least 8% of the batch, said glass being adapted for peak transmission of light of wave lengths between 480 and 490 millimicrons and for substantially complete absorption of light of wave lengths shorter than 400 millimicrons and of visible light of wave lengths longer than 600 millimicrons.

3. Glass articles of the character described of said shade having a thickness of approximately 3 mm. which are particularly durable and stable as to chemical attack and moisture attack at high humidity and high temperature resulting from the combining of:

| | Percent by weight |
|---|---|
| Silica, $SiO_2$ | From 44.86 to 64.10. |
| Sodium oxide, $Na_2O$ | From 0 to 15.30. |
| Potassium oxide, $K_2O$ | From 0 to 15.31. |
| Calcium oxide, CaO | From 3.5 to 11.82. |
| Bismuth trioxide, $Bi_2O_3$ | From 0 to 20.10. |
| Lead oxide, PbO | From 0 to 20.10. |
| Titanium dioxide, $TiO_2$ | From 0 to 1.90. |
| Copper oxide, CuO | From 2.86 to 4.47. |
| Cobalt oxide, $Co_2O_3$ | From 00.19 to 0.04. | wherein the sum of $Bi_2O_3$ and PbO must equal at least 20% of the total batch and the sum of $Na_2O$ and $K_2O$ must equal at least 8% of the batch, said glass being adapted for peak transmission of light of wave lengths between 480 and 490 millimicrons and for substantially complete absorption of light of wave lengths shorter than 400 millimicrons and of visible light of wave lengths longer than 600 millimicrons.

4. Glass articles ranging in shades of approximately 3.3 to approximately 5.0 for 3 mm. thickness whose chemical analyses are substantially as follows:

| | Percent by weight |
|---|---|
| Silica, $SiO_2$ | From 50.10 to 51.34. |
| Iron plus aluminum oxides, $R_2O_3$ | From 0.09 to 0.98. |
| Calcium oxide, CaO | From 9.88 to 10.36. |
| Sodium oxide, $Na_2O$ | From 9.40 to 9.59. |
| Potassium oxide, $K_2O$ | From 5.64 to 5.79. |
| Lead oxide, PbO | From 19.94 to 20.39. |
| Copper oxide, CuO | From 2.50 to 4.12. |
| Cobalt oxide, $Co_2O_3$ | From 0.005 to 0.018. | wherein the iron oxide plus aluminum oxide are present as impurity contaminations, said glass being adapted for peak transmission of light of wave lengths between 480 and 490 millimicrons and for substantially complete absorption of light of wave lengths shorter than 400 millimicrons and of visible light of wave lengths longer than 600 millimicrons.

5. A glass article of shade 3.3 for 3 mm. thickness whose chemical analysis is substantially as follows:

| | Percent by weight |
|---|---|
| Silica, $SiO_2$ | 51.34 |
| Iron plus aluminum oxides, $R_2O_3$ | 0.90 |
| Calcium oxide, CaO | 10.36 |
| Sodium oxide, $Na_2O$ | 9.59 |
| Potassium oxide, $K_2O$ | 5.79 |
| Lead oxide, PbO | 19.94 |
| Copper oxide, CuO | 2.50 |
| Cobalt oxide, $Co_2O_3$ | 0.005 | wherein the iron oxide plus aluminum oxide are present as impurity contaminations, said glass being adapted for peak transmission of light of wave lengths between 480 and 490 millimicrons and for substantially complete absorption of light of wave lengths shorter than 400 millimicrons and of visible light of wave lengths longer than 600 millimicrons.

6. A glass article of shade 5.0 for 3 mm. thickness whose chemical analysis is substantially as follows:

| | Percent by weight |
|---|---|
| Silica, $SiO_2$ | 50.10 |
| Iron plus aluminum oxides, $R_2O_3$ | 0.98 |
| Calcium oxide, CaO | 9.88 |
| Sodium oxide, $Na_2O$ | 9.40 |
| Potassium oxide, $K_2O$ | 5.64 |
| Lead oxide, PbO | 20.39 |
| Copper oxide, CuO | 4.12 |
| Cobalt oxide, $Co_2O_3$ | 0.018 | wherein the iron oxide plus aluminum oxide are present as impurity contaminations, said glass being adapted for peak transmission of light of wave lengths between 480 and 490 millimicrons and for substantially complete absorption of light of wave lengths shorter than 400 millimicrons and of visible light of wave lengths longer than 600 millimicrons.

7. A glass article of the character described of approximately 2.5 shade having a thickness of approximately 3 mm. resulting from the combining of:

| | Percent by weight |
|---|---|
| Silica, $SiO_2$ | 61.48 |
| Sodium oxide, $Na_2O$ | 6.50 |
| Potassium oxide, $K_2O$ | 3.90 |
| Calcium oxide, CaO | 5.86 |
| Lead oxide, PbO | 20.66 |
| Copper oxide, CuO | 1.60 |
| Cobalt oxide, $Co_2O_3$ | 0.0012 | said glass being adapted for peak transmission of light of wave lengths between 480 and 490 millimicrons and for substantially complete absorption of light of wave lengths shorter than 400 millimicrons and of visible light of wave lengths longer than 600 millimicrons.

8. A welding plate embodying a glass resulting from the range of ingredients set forth in claim 1 having a thin coating of gold on a side surface thereof.

9. A welding plate embodying a glass resulting from the range of ingredients set forth in claim 2 having a thin coating of gold on a side surface thereof.

10. A welding plate embodying a glass resulting from the range of ingredients set forth in claim 3 having a thin coating of gold on a side surface thereof.

11. A welding plate embodying a glass resulting from the chemical analysis as set forth in claim 4 having a thin coating of gold on a side surface thereof.

12. A welding plate embodying a glass plate having the chemical analysis as set forth in claim 5 having a thin coating of gold on a side surface thereof.

13. A welding plate embodying a glass plate having the chemical analysis as set forth in claim 6 having a thin coating of gold on a side surface thereof.

14. A welding plate embodying a plate of glass resulting from the combination of ingredients as set forth in claim 7 having a thin coating of gold on a side surface thereof.

References Cited in the file of this patent

UNITED STATES PATENTS

| | | |
|---|---|---|
| 2,676,109 | Barnes et al. | Apr. 20, 1954 |
| 2,854,349 | Dreyfus et al. | Sept. 30, 1958 |
| 2,912,339 | Middleswarth et al. | Nov. 10, 1959 |

OTHER REFERENCES

Weyl: "Coloured Glasses," pub. 1959 by Dawson's of Pall Mall, London (pages 165–167 and p. 190).